United States Patent
Petersen et al.

(10) Patent No.: US 7,130,724 B2
(45) Date of Patent: Oct. 31, 2006

(54) AIRCRAFT CABIN EQUIPMENT CONTROL SYSTEM

(75) Inventors: Benno Petersen, Herdwangen (DE); Gerardo Walle, Überlingen (DE)

(73) Assignee: Diehl Avionik Systeme GmbH, Ueberlingen (DE)

( * ) Notice: Subject to any disclaimer, the term of this patent is extended or adjusted under 35 U.S.C. 154(b) by 298 days.

(21) Appl. No.: 10/846,227

(22) Filed: May 10, 2004

(65) Prior Publication Data

US 2004/0249521 A1 Dec. 9, 2004

(30) Foreign Application Priority Data

Jun. 3, 2003 (DE) ................... 103 25 258

(51) Int. Cl.
*B64D 47/00* (2006.01)
*G06F 19/00* (2006.01)

(52) U.S. Cl. .............. 701/3; 701/33; 701/35; 710/10; 710/104; 710/129

(58) Field of Classification Search .......... 701/3, 701/1, 33, 35; 710/10, 63, 64, 104, 110, 710/126, 129, 131
See application file for complete search history.

(56) References Cited

U.S. PATENT DOCUMENTS

| | | | | |
|---|---|---|---|---|
| 4,774,514 A | * | 9/1988 | Hildebrandt et al. | 340/971 |
| 5,386,363 A | * | 1/1995 | Haak et al. | 701/3 |
| 5,778,203 A | * | 7/1998 | Birkedahl et al. | 710/306 |
| 5,815,649 A | * | 9/1998 | Utter et al. | 714/6 |
| 5,854,591 A | * | 12/1998 | Atkinson | 725/76 |
| 5,936,318 A | | 8/1999 | Weiler et al. | |
| 6,393,343 B1 | * | 5/2002 | Frey et al. | 701/3 |
| 6,719,245 B1 | | 4/2004 | Wagner | 244/118.5 |
| 2002/0026296 A1 | * | 2/2002 | Lohmann et al. | 703/1 |
| 2003/0039261 A1 | | 2/2003 | Purpura | |
| 2004/0119748 A1 | | 6/2004 | Kopitzke et al. | |
| 2004/0145612 A1 | | 7/2004 | Kopitzke et al. | |
| 2005/0004725 A1 | | 1/2005 | Riedel et al. | 701/29 |

FOREIGN PATENT DOCUMENTS

| | | |
|---|---|---|
| DE | 19617915 A1 | 11/1997 |
| DE | 19710286 C1 | 6/1998 |
| DE | 10100273 A1 | 1/2002 |
| EP | 1 372 079 A2 | 12/2003 |
| WO | 02019859 A2 | 3/2003 |
| WO | 03/091101 A1 | 11/2003 |

\* cited by examiner

*Primary Examiner*—Tan Q. Nguyen
(74) *Attorney, Agent, or Firm*—Laurence A. Greenberg; Werner H. Stemer; Ralph E. Locher

(57) ABSTRACT

An aircraft cabin equipment control system has control hardware that includes a data processing apparatus and a plurality of interfaces for connection to items of cabin equipment of an aircraft, as well as equipment programs for controlling the cabin equipment. To simplify manufacture of the aircraft cabin equipment control system and to achieve more flexible power distribution within the aircraft, there is provided an aircraft cabin equipment control system which has a configuration manager that records and stores equipment data which characterize both the number of the items of cabin equipment to be controlled and also the type of the items of cabin equipment themselves, and on the basis of the equipment data in conjunction with data characterizing the aircraft to set up configurations which form the basis for control of the cabin equipment.

20 Claims, 2 Drawing Sheets

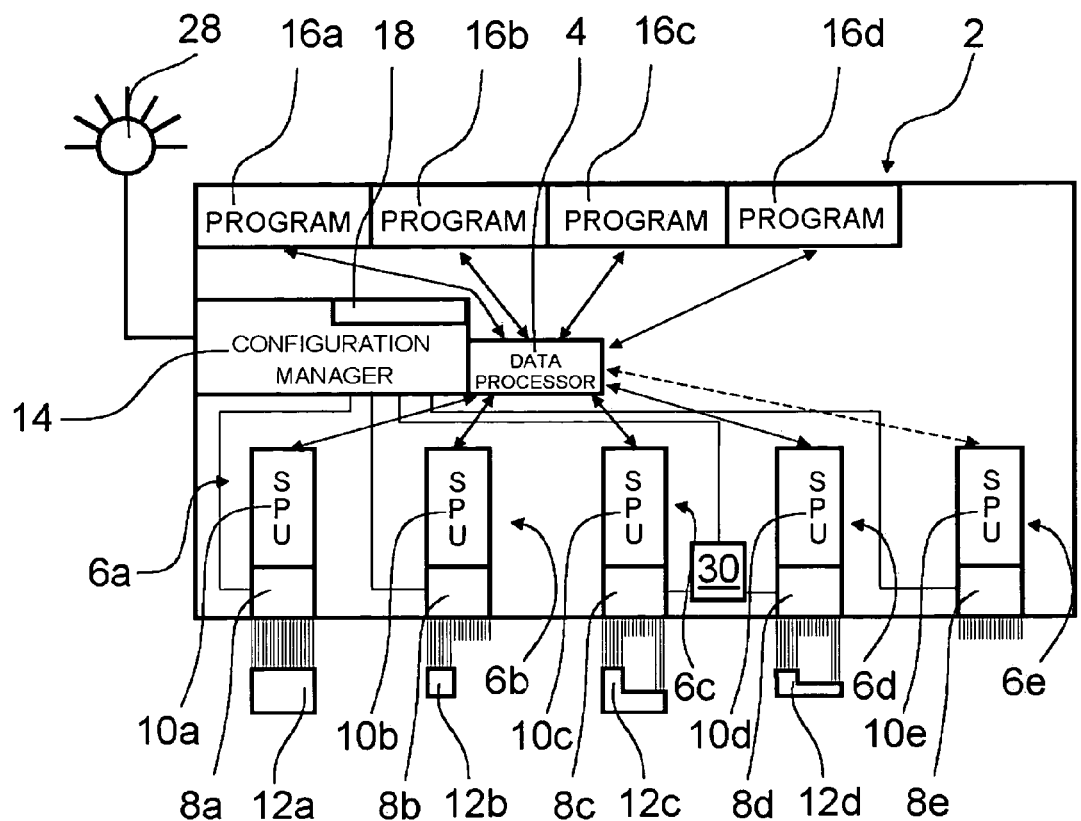
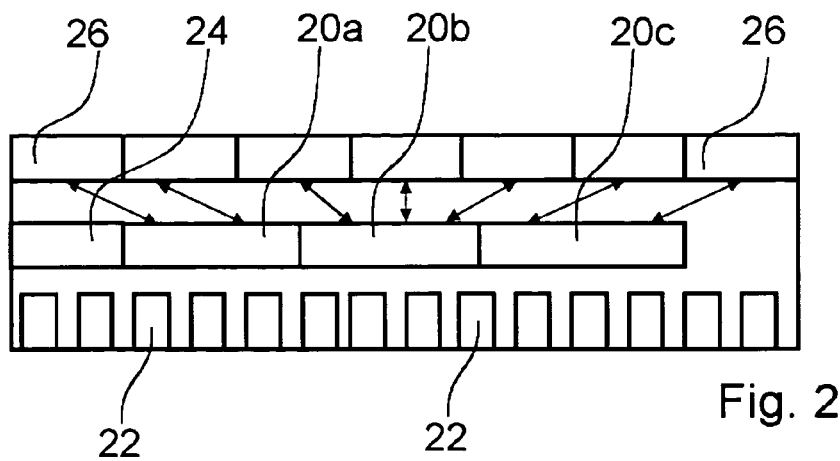
Fig. 1
Fig. 2

AIRCRAFT CABIN EQUIPMENT CONTROL SYSTEM

BACKGROUND OF THE INVENTION

Field of the Invention

The invention concerns an aircraft cabin equipment control system comprising control hardware which includes a data processing apparatus and a plurality of interfaces for connection to items of cabin equipment of an aircraft, and equipment programs for controlling the cabin equipment.

Aircraft such as an airplanes, dirigibles, Zeppelin or airships, and helicopters or the like include a passenger cabin or a pilot cabin which is equipped with a number of items of electrical equipment. Such equipment can be monitoring devices, for example devices for monitoring air pressure, air temperature and the oxygen content in the cabin, or devices such as a display screen in a passenger seat, a waste water monitoring device or a cooking unit. In that respect a distinction is drawn between first items of cabin equipment which can be essentially freely selected by an airline, for example the nature and number of on-board cooking appliances, seat actuators or entertainment apparatuses (in flight entertainment), and second items of cabin equipment which are relevant to cabin safety such as for example sensors, air supply actuators or the like.

The nature of the cabin equipment control system is dependent on the type of aircraft and is thus constructed by the aircraft manufacturer or a supplier. The cabin equipment itself and the equipment programs for controlling the cabin equipment are produced by further suppliers. To control the cabin equipment in the aircraft, the aircraft cabin equipment control system must be adapted with its design in terms of hardware to the cabin equipment and the equipment programs thereof. As not only each type of aircraft includes cabin equipment which differs in nature and number but each individual airplane is adapted to the wishes of the airline ordering the airplane, the aircraft cabin equipment control system must be individually tailor-made for each aircraft, which is complicated and cost-intensive.

SUMMARY OF THE INVENTION

It is accordingly an object of the invention to provide an aircraft cabin equipment control system, which overcomes the above-mentioned disadvantages of the heretofore-known devices and methods of this general type and which is easily adaptable and inexpensive.

With the foregoing and other objects in view there is provided, in accordance with the invention, an aircraft cabin equipment control system, comprising:

control hardware including a data processing apparatus and a plurality of interfaces for connection to items of cabin equipment of an aircraft, and equipment programs for controlling the cabin equipment; and a configuration manager configured to store equipment data characterizing an extent of the items of cabin equipment to be controlled and the items of cabin equipment themselves, and configured to set up configurations forming a basis for controlling the cabin equipment based on the equipment data in conjunction with data characterizing the aircraft.

In other words, the objects of the invention are attained by an aircraft cabin equipment control system of the kind set forth in the above introductory text, which, in accordance with the invention, has a configuration manager that is designed to record and store equipment data which characterize both the extent of the items of cabin equipment to be controlled and also the items of cabin equipment themselves, and on the basis of the equipment data in conjunction with data characterizing the aircraft to set up configurations which form the basis for control of the cabin equipment.

The invention is based on the consideration that adaptation of an existing aircraft cabin equipment control system to cabin equipment in each case is complicated and expensive if a relatively large number of different hardware components which are tailor-made to the cabin equipment have to be integrated into the aircraft cabin equipment control system. It is fundamentally easier to achieve adaptation if it can be effected to an at least substantial extent by programming of standard hardware. For that purpose it is necessary to provide interfaces, usually a number of electronic components arranged on a printed circuit board, with an incorporated contacting region, which are in a position for communication with all or at least a significant number of different items of cabin equipment used in aircraft. Establishing such interfaces can be easily and inexpensively implemented. In that way it is possible to provide standard control hardware which for example can only still be adapted in terms of its efficiency and capability to various types of airplanes or the wishes of an airline company. To adapt the aircraft cabin equipment control system to a type of airplane or a desired cabin equipment setup, the airplane manufacturer or the supplier of the control system must individually program each control assembly.

The invention is therefore based on the further notion that such adaptation of the aircraft cabin equipment control system can be simplified by a configuration manager setting up initial configurations on which control of the items of cabin equipment is based, on the basis of equipment data and aircraft data. The airline company or the aircraft constructor then only has to input the equipment data and aircraft data and no longer intervene in the configuration of the hardware. In addition, the configuration procedure can be subdivided into various levels: a region which the control system manufacturer or the airline company of second items of cabin equipment which are suitably fixedly installed in the aircraft and which are relevant to safety are set up, and a region which the airline company operating the aircraft can set up.

Equipment data which reproduce the extent of and specific characterizations of the cabin equipment as well as aircraft data which for example characterize the nature and size of the aircraft or existing control hardware are inputted into the configuration manager for example by way of a keyboard or a CD-ROM. Adjustment of the control system, such as for example setting flags or crucial control data such as for example basic data relating to the distribution of electrical power to individual items of cabin equipment, groups of items of cabin equipment or the totality of the cabin equipment, is implemented by the configuration manager. The configuration manger can be an apparatus including hardware and software, or only software which is integrated into the data processing apparatus.

Advantageously, the aircraft-characterizing data are the number and nature of the existing interfaces of the control hardware, and the configuration manager is intended to provide for transmission of signals produced by an equipment program to an interface. That transmission, also referred to as routing, can be implemented in that way very easily and at any moment in time, for example after performing maintenance operations. Routing can be effected easily without an operator having to execute programming in a lower level of the aircraft cabin equipment control system.

Desirably the control hardware includes a plurality of similar interfaces so that the routing of control signals can be effected to any one of the similar interfaces, whereby a high degree of flexibility is achieved.

It is further proposed that the interfaces each have a contacting region and a signal processing unit and the configuration manager is provided to adjust the mode of operation of a signal processing unit to equipment signals of an item of cabin equipment to be connected. Items of cabin equipment such as for example sensors emit signals which describe a condition of the cabin equipment. Those signals have to be read out, possibly digitized and subjected to further processing in order for them to be used to control for example actuators. That reading-out operation can be executed by the signal processing unit which in that case has to be set for reading out and possibly further processing the equipment signals. Such a setting can be pre-programmed and made available to the configuration manager so that adaptation of the signal processing unit to the equipment signals of the respective item of cabin equipment which is to be connected can be effected easily and quickly after allocation of the interface to an item of cabin equipment.

Desirably the configuration manager is provided for communicating to the data processing apparatus hardware data characterizing the number and occupation of the interfaces present. It is possible in that way for essentially any assemblies of standard interfaces to be easily combined with a standard data processing apparatus or a plurality of standard data processing apparatuses. In particular the configuration manager is adapted to communicate to the data processing apparatus the number and nature of any further data processing apparatuses which may possibly be present. The efficiency and capability of the aircraft cabin control system can be easily adapted to the requirements of the cabin equipment to be controlled.

Desirably the configuration manager is adapted to access a fault routine related to an item of cabin equipment and to cause implementation of the commands contained therein. In that way a central fault management can be set up at the configuration manager, so that it is possible to do away with decentral fault management in regard to the equipment programs for controlling the items of cabin equipment. Not only can the equipment programs be simplified in that way, but also fault management can be adapted to the equipment environment and/or the flight situation of the aircraft. Thus for example in the takeoff phase of the aircraft, it is possible to react to a fault in an item of cabin equipment, differently from in a normal phase during flight or while waiting on a runway. It is also possible to take account of the equipment surroundings, in which case for example faults in further items of cabin equipment are incorporated into the fault routine.

In accordance with a further embodiment of the invention the configuration manager is adapted to process environment data in conjunction with the fault routine and to provide for implementation of commands resulting from such processing. The environment data are in particular data characterizing the aircraft such as for example the size of the aircraft, the maximum electrical power which can be produced in the aircraft or the like. Thus for example in the event of failure of a fan the power of other fans can be increased to compensate if the aircraft can provide the appropriate power. It is also possible for the data to characterize the instantaneous situation of the aircraft. It is also possible to incorporate whether the aircraft is in the takeoff or landing phase, the distance from the intended destination, flying height, turbulence or other situations. It is possible to attain a fault routine which is adapted to the flight situation. It is also possible for the data to characterize the configurational setup of further items of cabin equipment. In that way it is possible to incorporate into the fault routine whether a single existing device of one kind fails or whether there are present further similar devices which for example can come into operation to compensate for the fault. It is further possible for the data to characterize the instantaneous situation of at least one further item of cabin equipment. Thus the condition or the operability of further and in particular similar items of cabin equipment can be incorporated into the fault routine, like also the load range of items of cabin equipment.

In accordance with an advantageous feature of the invention, the configuration manager is adapted to provide for a circumstance-induced change in routing of signals produced by an equipment program, to an interface. In that way routing can be altered during operation without involving a high degree of complication and expenditure. If for example an interface is overloaded or has entirely or partially failed, signals can be diverted from the item of cabin equipment connected to the interface, to a further interface. The item of cabin equipment can be further used, with that defect being by-passed.

In that respect, a switchable signal transmission device is advantageously arranged between two interfaces, wherein the configuration manager is designed for switching the signal transmission device. Rerouting of the signals can be achieved by a simple circuit in the signal transmission device. The signal transmission device is desirably arranged between contacting regions of interfaces, whereby it is possible to completely circumvent a signal processing unit.

It is additionally proposed that the aircraft cabin equipment control system has a redundant interface which can be switched on by the configuration manager. In the event of failure of an interface that interface can be switched on and the item of cabin equipment in question can be kept operable.

In accordance with a further feature of the invention, the aircraft cabin equipment control system has a power regulating device which is provided for the distribution of electrical power in accordance with a power distribution key to items of cabin equipment, in which respect the aircraft-characterizing data are the maximum power which is to be made available at a maximum to the items of cabin equipment. It is possible in that way to set up a basic configuration in respect of flexible power distribution to items of cabin equipment. For example maximum power, the nature and number of the items of cabin equipment to be supplied with electrical power and the mode of operation thereof can be inputted to the configuration manager. From those data, the configuration manager can establish a basic configuration as to how much power is made available to which item of cabin equipment in what situation. In that way the maximum power can be distributed flexibly without subdivision among all items of cabin equipment which are incorporated by the configuration manager.

That therefore resolves the problem that a power control system was hitherto able to distribute an established level of power only within individual groups of items of equipment, for example all items of equipment around a seat position or all items of equipment of an on-board kitchen. Incorporation of all items of cabin equipment was not possible as the central control system which embraced power data of many different items of cabin equipment arranged at different power runs was not present. The incorporation of the configuration manager makes it possible to flexibly distribute a maximum amount of power which is related for example to the totality of all items of cabin equipment present, among all such items. There is no need to form sub-groups each with respective sub-maximum levels of power. In that way, with the same maximum power, it is possible to distribute substantially more power to the cabin equipment or the maximum power can be at a substantially lower level so that the aircraft can be designed to save more energy. The power distribution key can be freely inputted to the configuration manager and adapted to the wishes for example of an airline company.

In accordance with again an additional feature of the invention, the power distribution key differs between first items of cabin equipment and second items of cabin equipment which are relevant to cabin safety. The first items of cabin equipment are thereby connected to an open data transmission network and the second items of cabin equipment are connected to a closed data transmission network which is separated from the open data transmission network by a firewall. In that way even the second items of cabin equipment can be incorporated into a flexible power distribution so that, when second items of cabin equipment are not fully loaded, free power from the region of the second items of cabin equipment can be made available to the first items. The key for the second items of cabin equipment which are relevant to cabin safety should for example provide that, in the event of a power bottleneck, those items can basically be supplied with the power they demand, in which case the key for the first items of cabin equipment can provide for positive partial load or positive shut-down for first items of cabin equipment.

In principle it is possible for the maximum power for individual groups, for example for first and second items of cabin equipment, to be subdivided into separate sub-maximum power levels and for the power within the groups to be allocated independently of the instantaneous power draw of other groups. Group division and the allocation of sub-maximum levels of power can be effected in that situation by the configuration manager which can link both the division and the sub-maximum power levels to aircraft or situation parameters.

Particularly flexible power distribution can be achieved if the power distribution key includes at least 75% of the items of aircraft cabin equipment which are connected to the open network and the power regulating device monitors the power consumption of the cabin equipment and releases the power demanded by the cabin equipment overall, as far as a threshold value. The main load in the aircraft can be covered with those items of cabin equipment, in which case the percentage relates to the proportion of power of the items of cabin equipment. The threshold value is a power value, above which no power or only a limited level of power is distributed, for example insofar as only a part of the power required is distributed to all or selected items of cabin equipment. The threshold value can be the maximum power, a sub-maximum power level or a value below the maximum power or the sub-maximum power level.

Desirably the power regulating device is designed to establish a first maximum group power level for the first items of cabin equipment and a second maximum group power level for the second items of cabin equipment. In particular the two maximum group power levels can be established in dependence on each other. It is possible to achieve a high degree of flexibility in terms of distribution of power to the cabin equipment.

A high level of safety combined with flexible power distribution can be achieved if the power distribution key has a first key associated with the first items of cabin equipment and a second key associated with the second items of cabin equipment, wherein the configuration manager is adapted to enable the first key for free programming and block the second key. The first key can be freely selected and configured for example by the airline company operating the aircraft, at least within predetermined limits. In that way the key can be easily adapted by the aircraft company at any time to an individually designed setup of the aircraft. Basically sufficient power can be made available to cabin equipment which is relevant in terms of safety, by the blocked second key which is desirably established by the manufacturer of the aircraft, so that safety in the cabin remains ensured independently of the setup of the aircraft.

In accordance with a further advantageous feature of the invention, the power distribution key includes a third key which is associated with different flight phases of an aircraft and which can be blocked with free programmability of the first and/or second key. Independently of the fact of the aircraft being fitted with safety-relevant cabin equipment, that is to say independently of the second key, it is possible to set up a key provided for for example critical flight situations for the distribution of power to items of cabin equipment which in those situations must as far as possible remain operable.

It is further provided that the configuration manager is adapted to establish the upper limit of the available power variably in accordance with predetermined rules, below the maximum power. In that way the maximum power can be decoupled from the power which can be applied as a maximum by the aircraft, and it can be adapted to desired settings. The maximum power can be adapted for example to a desired level of fuel consumption.

Additional safety can be achieved if the upper limit is established in dependence on the flight phase. In flight phases in which less electrical power can be produced as in the takeoff phase or under critical flight situations, the upper limit can be throttled so that the engines can produce more power for thrust. In particular less than the required power can be rapidly allocated to cabin equipment if more thrust is unexpectedly demanded.

In accordance with a concomitant feature of the invention, first items of cabin equipment are connected to the power distribution device by way of power switches, with the firewall being bypassed. The data exchange by way of the firewall is kept at a low level and direct actuation of the power switches is achieved.

Other features which are considered as characteristic for the invention are set forth in the appended claims.

Although the invention is illustrated and described herein as embodied in an aircraft cabin equipment control system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic view of an aircraft cabin equipment control system according to the invention;

FIG. 2 is a diagrammatic view of an aircraft cabin equipment control system with a plurality of data processing apparatuses.

DESCRIPTION OF THE PREFERRED EMBODIMENTS

Figure 3:
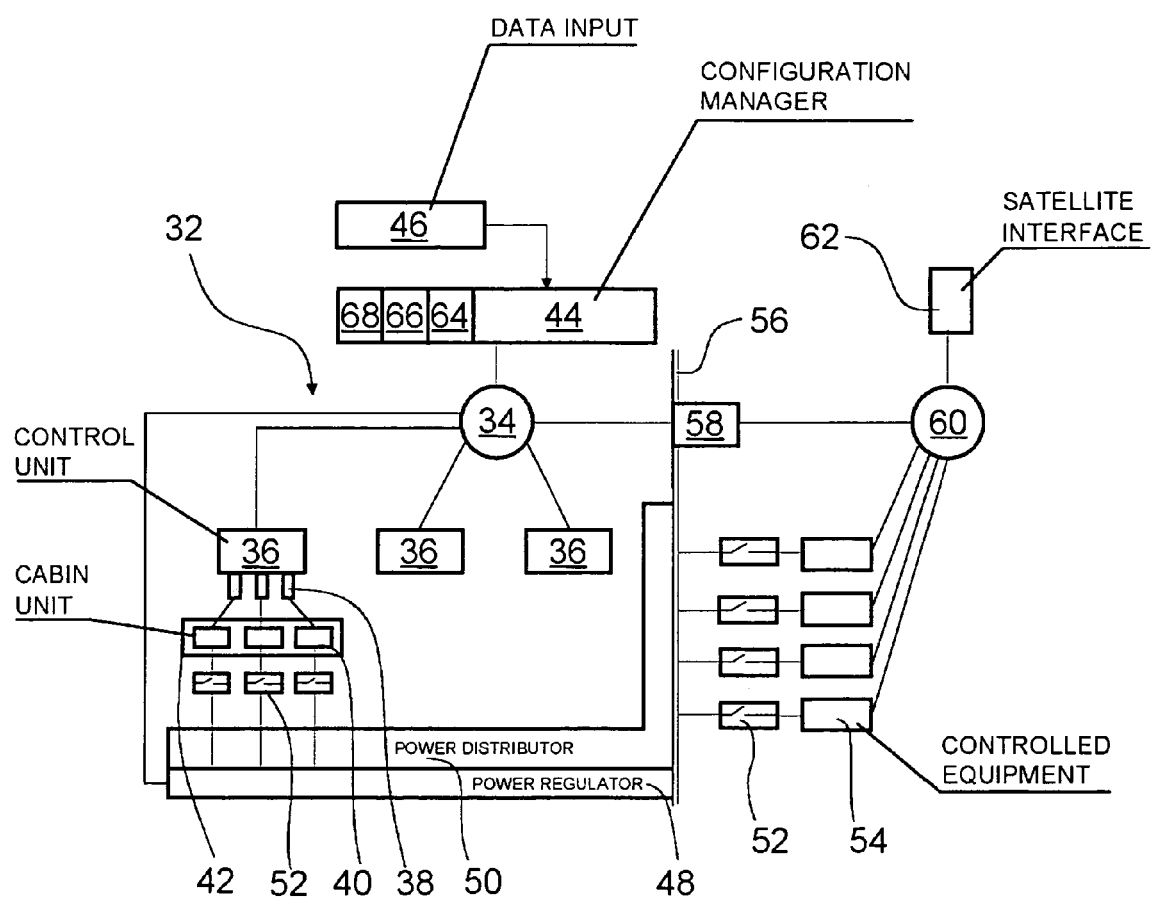
FIG. 3 is a diagrammatic view of the embedding of an aircraft cabin equipment control system into switching structures of an aircraft.

Referring now to the figures of the drawing in detail and first, particularly, to FIG. 1 thereof, there is shown a diagrammatic view of an aircraft cabin equipment control system 2 with a data processing apparatus 4 and a plurality of interfaces 6a–6e. The interfaces 6a–6e each include a respective contacting region 8a–8e and a signal processing unit (SPU) 10a–10e. The contacting regions 8a–8e are provided with contacting pins indicated by lines, of which a respectively required number is connected by way of connecting lines to a respective item of cabin equipment 12a–12d. In that respect not all contacting pins have to be occupied. The contacting pins of the interface 6e are not connected to an item of cabin equipment. Also included in the aircraft cabin equipment control system 2 is a configuration manager 14 which includes its own hardware and which is connected to the data processing apparatus 4 by a non-illustrated interface.

The aircraft cabin equipment control system 2 also includes equipment programs 16a–16d which are tailor-made for the items of cabin equipment 12a–12d and which are provided to control the latter. A fault routine 18 is also contained as software in the configuration manager. The routine 18 includes situation-related instructions for dealing with faults in the cabin equipment 12a–12d or the interfaces 6a–6e.

In the manufacture of the aircraft cabin equipment control system 2 by a control system manufacturer, it is firstly possible to provide a basis comprising the data processing apparatus 4, storage space for equipment programs and interfaces 6a–6e, which basis can be adapted to the number and the control expenditure in respect of the items of cabin equipment to be controlled. Adaptation can be effected in such a way that, besides a first data processing apparatus 20a shown in FIG. 2, there are provided further data processing apparatuses 20b, 20c which manage data processing in parallel.

The number of interfaces 22 can also be adapted to the number of items of cabin equipment. The interfaces 6a–6e and 22 are all the same, in which respect they are so designed that each individual one of the items of cabin equipment can be controlled with that kind of interface. It is alternatively also possible to provide a small number of standards, for example three different kinds of interfaces, with small, medium and high numbers of contacting pins, data processing rates, complexity of the signal processing unit or the like. The basics of the aircraft cabin equipment control system 2 can then be provided with a configuration manager 14, 24 which is in the form of software or in the form of hardware and software.

The setting of the aircraft cabin equipment control system 2 to the items of cabin equipment 12a–12d which are to be controlled can be effected in a simple manner by running software. In that case the equipment programs 16a–16d, 26 are loaded and equipment data which characterize both the extent of the items of cabin equipment 12a–12d to be controlled, and also the items of cabin equipment 12a–12d themselves, for example the nature of the condition signals delivered or the expected control signals, are notified to the configuration manager 14, 24. In addition, the configuration manager 14, 24 is notified of the nature and number of the interfaces 6a–6e, 22 and data processing apparatuses 4, 20a, 20c present, and the linkages of the items of cabin equipment 12a–12d to the interfaces 6a–6e, 22. In addition, the fault routine 18 which contains situation-related, aircraft-related and cabin equipment-related instructions can be run in the configuration manager 14.

The configuration manager 4, 24, on the basis of the inputted data, can now set up the configurations on which control of the cabin equipment 12a–12d is based. Those configurations embrace setting the signal processing units 10a–10d to the respectively connected items of cabin equipment 12a–12d and the association, indicated by the double-headed arrows, of the instruction given by an equipment program 16a–16d, 26 with the relevant interface or interfaces 6a–6d, 22 and the relevant item or items of cabin equipment 12a–12d. Optionally the configurations may also include the instructions for the co-operation of a plurality of data processing apparatuses 24 or interfaces 22.

In addition to setting up the configurations, during operation of the aircraft in which the configuration manager 14 is operative, the configuration manager 14 can monitor the control of the cabin equipment 12a–12d or intervene into such control. That can occur for example in the case of a defect in an item of cabin equipment 12a–12d or an interface 6a–6d or other control-relevant components. The situation-related procedure of the configuration manager 14 is laid down in the fault routine 18. The configuration manager 14 is connected to a network 28 which in turn is connected to non-illustrated control devices of the aircraft. From those control devices, data characterizing the instantaneous situation of the aircraft can be passed to the configuration manager 14 and incorporated into the fault treatment procedure.

In the case of a defect at an interface 6a–6d the configuration manager 14 can also change the routing by the tasks of the defective interface 6a–6d being transferred for example to a redundant interface 6e. For that purpose the contacting regions 8a–8e of the interfaces 6a–6e are connected to the configuration manager 14 so that signals coming from an item of cabin equipment 12a–12d can be passed directly to the configuration manager 14 and from there by way of a switching element (not shown) to the redundant interface 6e, processed there and sent to the data processing apparatus 4. To compensate for an instantaneous overload or a defect at an interface 6a, 6d, the interfaces 6c, 6d are connected together by a switching element 30 so that the interfaces 6c, 6d can mutually take over tasks. That is particularly advantageous when dealing with similar items of cabin equipment 12c, 12d.

FIG. 3 is a diagrammatic view showing the embedding of an aircraft cabin control system 32 into the environment of an aircraft. The aircraft cabin control system 32 includes a plurality of control units 36 connected to a closed data transmission network 34, each with a data processing apparatus (not explicitly shown) and interfaces 38. Connected to the interfaces 38 are respective second items of cabin equipment 40 which are relevant to cabin safety and which are connected together to form equipment units 42 of which only one is illustrated for the sake of clarity. The illustrated equipment unit 42 includes the air supply for the cabin of the aircraft. The further control units (not shown) include, for example, cabin pressure regulation, air conditioning regulation, leakage and overheating monitoring systems, water and waste water regulation, and so forth. Also connected to the closed data transmission network 34 is a configuration manager 44 which is provided for receiving data by way of a data input means 46. A power regulating device 48 with a power distribution device 50 is also connected to the data transmission network 34. Power switches 52 are arranged between the power distribution device 50 and the second items of cabin equipment 40.

Further power switches 52 are connected through a firewall indicated at 56 both to the power distribution device 50 and also first items of cabin equipment 54 which do not have any material relevance to cabin safety. Those first items of cabin equipment 54 are entertainment units (in-flight entertainment), kitchen equipment, seat actuators, lighting units and many others. The closed data transmission network 34 is connected by a safety interface 58 to an open data transmission network 60 which is connected to the exterior for example by way of a satellite interface 62.

For operation of the aircraft cabin control system 32 the configuration manager 44 produces a power distribution key as a configuration from equipment data and the maximum power which is to be made available to the items of cabinet equipment 40, 44, and it transmits the key to the power regulating device 48. The power regulating device 48 regulates power distribution by way of the power distribution device 50 and the power switches 52 to the items of cabin equipment (40, 54). The maximum power is the power which is to be passed overall as a maximum to all items of cabin equipment 40, 54 associated with the aircraft cabin.

The power distribution key includes three keys 64, 66, 68, wherein the first key 64 is associated with first items of cabin equipment 54 and can be freely programmable within limits by an aircraft operator, for example an airline. The second key 66 is associated with the second items of cabin equipment 40 to which a higher power supply priority is granted than to the first items of cabin equipment 54. The second key 66 is programmed in dependence on the cabin equipment setup by the aircraft manufacturer or a supplier and can be blocked against access by an airline. The third key is associated with critical flight situations and can also be blocked in relation to re-programming so that only the aircraft manufacturer or a supplier has access thereto.

An upper limit of power delivered to items of cabin equipment 40, 54, the upper limit being below the maximum power, is variably set by the configuration manager 44 in dependence on the flight phase. If the power required by the cabin equipment 40, 54 exceeds a threshold value which is at 90% of the upper limit, power is only still made available in restricted form for the second items of cabin equipment.

This application claims the priority, under 35 U.S.C. § 119, of German patent application No. 103 25 258.4, filed Jun. 3, 2003; the entire disclosure of the prior application is herewith incorporated by reference.

We claim:

1. An aircraft cabin equipment control system, comprising:

control hardware including a data processing apparatus and a plurality of interfaces for connection to items of cabin equipment of an aircraft, and equipment programs for controlling the cabin equipment;

a configuration manager configured to store equipment data characterizing an extent of the items of cabin equipment to be controlled and the items of cabin equipment themselves, and configured to set up configurations forming a basis for controlling the cabin equipment based on the equipment data in conjunction with data characterizing the aircraft; and a power regulating device for distributing electrical power in accordance with a power distribution key to items of cabin equipment.

2. The control system according to claim 1, wherein the data characterizing the aircraft comprise a number and type of the interfaces of the control hardware, and said configuration manager is configured to set up a transmission of signals produced by an equipment program to an interface.

3. The control system according to claim 2, wherein each of said interfaces has a contacting region and a signal processing unit, and said configuration manager is adapted to set a mode of operation of a respective said signal processing unit with reference to equipment signals of an item of cabin equipment to be connected.

4. The control system according to claim 1, wherein said configuration manager is adapted to access a fault routine related to an item of cabin equipment and to cause execution of commands contained therein.

5. The control system according to claim 4, wherein said configuration manager is configured to process environment data in conjunction with the fault routine and to cause execution of commands resulting from said processing, and the environment data are data selected from the group consisting of data characterizing the aircraft; data characterizing an instantaneous situation of the aircraft; data characterizing a configuration of further items of cabin equipment; and data characterizing an instantaneous situation of at least one further item of cabin equipment.

6. The control system according to claim 1, wherein said configuration manager is adapted to provide a circumstance-governed change in a transmission of signals produced by an equipment program to an interface.

7. The control system according to claim 1, which comprises a switching element connected between two interfaces and connected to said configuration manager, and wherein said configuration manager is adapted to switch said switching element.

8. The control system according to claim 1, which comprises a redundant interface connected to and enabled to be switched on by said configuration manager.

9. The control system according to claim 1, wherein the data characterizing the aircraft include a maximum power to be made available to the items of cabin equipment.

10. The control system according to claim 9, wherein the power distribution key distinguishes between first items of cabin equipment and second items of cabin equipment relevant to cabin safety, and wherein the first items of cabin equipment are connected to an open data transmission network and the second items of cabin equipment are connected to a closed data transmission network separated from the open data transmission network by a firewall.

11. The control system according to claim 10, wherein the power distribution key includes at least 75% of the items of cabin equipment connected to the open data transmission network and said power regulating device is configured to monitor a power consumption of the items of cabin equipment and to release a power demanded from the cabin equipment, up to a threshold value.

12. The control system according to claim 10, wherein said power regulating device is adapted to establish a first maximum group power for the first items of cabin equipment and a second maximum group power for the second items of cabin equipment.

13. The control system according to claim 12, wherein the first and second maximum group power levels are mutually interdependent power levels.

14. The control system according to claim 10, which comprises a power distribution device, and power switches connecting said first items of cabin equipment to a power distribution device and bypassing said firewall.

15. The control system according to claim 9, wherein the power distribution key has a first key associated with first items of cabin equipment and a second key associated with second items of cabin equipment, and wherein said configuration manager is adapted to enable the first key for free programming and to block the second key.

16. The control system according to claim 15, wherein the power distribution key has a third key associated with different flight phases of an aircraft, and the third key can be blocked upon free programmability of one of the first key and the second key.

17. The control system according to claim 9, wherein said configuration manager is adapted to establish a variable upper limit of available power in accordance with predetermined rules below the maximum power.

18. The control system according to claim 17, wherein said configuration manager is adapted to establish the upper limit in dependence on a flight phase of the aircraft.

19. An aircraft cabin equipment control system, comprising:
   control hardware including a data processing apparatus and a plurality of interfaces for connection to items of cabin equipment of an aircraft, and equipment programs for controlling the cabin equipment;
   a configuration manager configured to store equipment data characterizing an extent of the items of cabin equipment to be controlled and the items of cabin equipment themselves, and configured to set up configurations forming a basis for controlling the cabin equipment based on the equipment data in conjunction with data characterizing the aircraft; and
   a power regulating device for distributing electrical power to the items of cabin equipment in accordance with a power distribution key, the power distribution key distinguishing between first items of cabin equipment and second items of cabin equipment relevant to cabin safety.

20. The aircraft cabin equipment control system according to claim 19, wherein the first items of cabin equipment are connected to an open data transmission network and the second items of cabin equipment are connected to a closed data transmission network separated from the open data transmission network by a firewall.

* * * * *